(12) United States Patent
Kaneko et al.

(10) Patent No.: US 11,512,168 B2
(45) Date of Patent: Nov. 29, 2022

(54) HYDROPHILIC POLYAMIDE OR POLYIMIDE

(71) Applicant: JAPAN SCIENCE AND TECHNOLOGY AGENCY, Kawaguchi (JP)

(72) Inventors: Tatsuo Kaneko, Nomi (JP); Sumant Dwivedi, Hattiesburg, MS (US); Shigeki Sakamoto, Yokosuka (JP); Kenji Takada, Nomi (JP); Yasuyoshi Funahashi, Nomi (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 319 days.

(21) Appl. No.: 16/634,209

(22) PCT Filed: Jul. 27, 2018

(86) PCT No.: PCT/JP2018/028270
§ 371 (c)(1),
(2) Date: Jan. 27, 2020

(87) PCT Pub. No.: WO2019/026795
PCT Pub. Date: Feb. 7, 2019

(65) Prior Publication Data
US 2020/0207917 A1 Jul. 2, 2020

(30) Foreign Application Priority Data

Jul. 29, 2017 (JP) .............................. JP2017-147291

(51) Int. Cl.
| C08G 69/26 | (2006.01) |
| C08G 73/10 | (2006.01) |
| C08K 5/17 | (2006.01) |
| C08L 79/08 | (2006.01) |

(52) U.S. Cl.
CPC ............ C08G 73/1078 (2013.01); C08K 5/17 (2013.01); C08L 79/08 (2013.01); *C08G 2220/00* (2013.01); *C08L 2203/16* (2013.01)

(58) Field of Classification Search
CPC ............ C08G 73/1078; C08G 73/1007; C08G 73/1075; C08G 73/10; C08G 2220/00; C08K 5/17; C08L 79/08; C08L 2203/16; C08J 3/075
See application file for complete search history.

(56) References Cited

U.S. PATENT DOCUMENTS

| 2011/0172324 A1 | 7/2011 | Hwang et al. |
| 2013/0260223 A1 | 10/2013 | Jeong et al. |
| 2014/0323679 A1 | 10/2014 | Kaneko et al. |
| 2016/0159985 A1 | 6/2016 | Takiue |

FOREIGN PATENT DOCUMENTS

| CN | 101874078 A | 10/2010 |
| JP | 2011-144374 A | 7/2011 |
| JP | 2015-939 A | 1/2015 |
| JP | 2016-166315 A | 9/2016 |
| WO | WO2013/073519 A1 | 5/2013 |

OTHER PUBLICATIONS

Extended European Search Report dated Apr. 12, 2021 in European Patent Application No. 18841868.5, 9 pages.
Xin Jin, et al., "Salt-Induced Reinforcement of Anionic Bio-Polyureas with High Transparency" Polymer Journal, vol. 47, No. 11, Aug. 19, 2015, pp. 727-732.
Combined Chinese Office Action and Search Report dated Nov. 2, 2021 in Patent Application No. 201880048743.2 (with English machine translation), 20 pages.
International Search Report dated Oct. 9, 2018 in PCT/JP2018/028270 filed Jul. 27, 2018, 1 page.
Tzu-Tien Huang, et al., "Highly transparent and flexible bio-based polyimide/TiO$_2$ and ZrO$_2$ hybrid films with tunable refractive index, Abbe number and memory properties," Nanoscale, vol. 8, 2016, pp. 12793-12802.

*Primary Examiner* — Robert S Jones, Jr.
(74) *Attorney, Agent, or Firm* — Oblon, McClelland, Maier & Neustadt, L.L.P.

(57) ABSTRACT

Provided are a hydrophilic polyamide and polyimide retaining characteristics particular to polyamides and polyimides, such as heat resistance. A polymeric compound is provided having a repeating unit represented by the following formula (1):

(1)

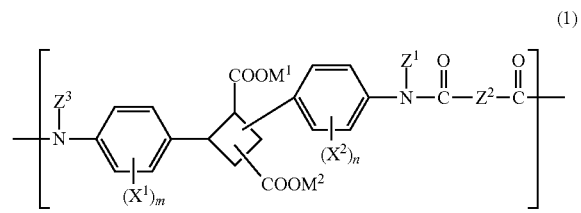

wherein $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time; $X^1$ and $X^2$ represent an organic group; m and n each independently represent the number of substituents; $Z^1$ represents a hydrogen atom or an optionally substituted carbonyl group; $Z^2$ represents an optionally substituted hydrocarbon group; $Z^3$ represents a hydrogen atom or an optionally substituted carbonyl group; and when $Z^1$ or $Z^3$ is an optionally substituted carbonyl group, they optionally form a ring structure together with $Z^2$, each independently.

13 Claims, 5 Drawing Sheets

HYDROPHILIC POLYAMIDE OR POLYIMIDE

TECHNICAL FIELD

The present invention relates to a hydrophilic polyamide or polyimide.

BACKGROUND ART

Polymeric materials such as polyimides and polyamides are high-performance plastics widely used in a variety of fields such as electrical engineering, electronic engineering and space engineering, and needs for these materials are extremely high. Conventionally, almost all of these polymeric materials have been synthesized from petroleum-derived raw materials, and therefore, expansion of demand to them runs counter to reduction of carbon emissions.

On the other hand, bioplastics, which are polymeric materials using naturally derived raw materials, are, not like biofuels, expected to fix carbon dioxide for a long period of time. It is believed that practical application of bioplastics largely contributes to reduction of carbon emissions; however, there has been a big problem that the production cost therefor is high. From a viewpoint different form this, even in the case where highly expensive biomolecules are used, as long as those materials have high added value like super engineering plastics, they can also be satisfactory in terms of cost effectiveness, and have a potentiality of spreading widely to the society.

From such a viewpoint, the present inventors have produced a polyamide or polyimide using a dimer of naturally derived 4-aminocinnamic acid as the raw material, and have found and previously reported that such polyamide or polyimide exhibits excellent heat resistance, high tensile strength and high transparency, and is useful as a polymeric material in a wide variety of fields (Patent Literatures 1 and 2).

In addition, because polyimides have a rigid backbone, they have a disadvantage of exhibiting poor solubility to water and organic solvents and having low formability. Accordingly, development of a polyimide with improved formability has been carried out (Patent Literatures 3 and 4).

CITATION LIST

Patent Literature

Patent Literature 1: International Publication No. WO 2013/073519
Patent Literature 2: JP-A-2016-166315
Patent Literature 3: JP-A-2015-000939
Patent Literature 4: JP-A-2011-144374

SUMMARY OF INVENTION

Technical Problem

However, the polyimide described in Patent Literature 3 uses an organic solvent, and therefore, there is, for example, a problem that the organic solvent is volatilized upon forming of the polyimide, thereby aggravating the working environment. In addition, the polyimide described in Patent Literature 4 exhibits water solubility, but presents a disadvantage of necessarily having poor heat resistance, which is a property particular to polyimides, because it has a siloxane backbone.

Accordingly, an object of the present invention is to provide a hydrophilic polyamide and polyimide retaining characteristics particular to polyamides and polyimides, such as heat resistance.

Solution to Problem

As a result of diligent researches in order to develop a hydrophilic polyamide and polyimide retaining characteristics such as heat resistance, the present inventors have found that a polyamide and polyimide obtained by converting the ester moiety of the polyamide and polyimide previously reported by the present inventors into a carboxylate salt retains excellent heat resistance even though it has high hydrophilicity, can be processed under conditions with small environmental burdens, and furthermore, can be formed into a gel, and therefore it can be applied to a wide variety of fields, thereby completing the present invention.

That is, the present invention provides the following inventions [1] to [11].

[1] A polymeric compound comprising a repeating unit represented by the following formula (1):

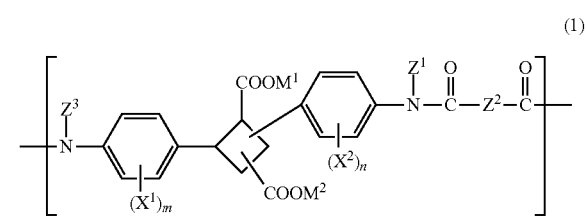

wherein $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an organic group;

m and n each independently represent the number of substituents;

$Z^1$ represents a hydrogen atom or an optionally substituted carbonyl group;

$Z^2$ represents an optionally substituted hydrocarbon group;

$Z^3$ represents a hydrogen atom or an optionally substituted carbonyl group; and when $Z^1$ or $Z^3$ is an optionally substituted carbonyl group, they optionally form a ring structure together with $Z^2$, each independently.

[2] The polymeric compound according to [1], wherein the repeating unit thereof is represented by the following formula (2-1) or (2-2):

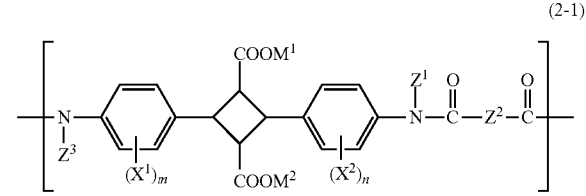

-continued

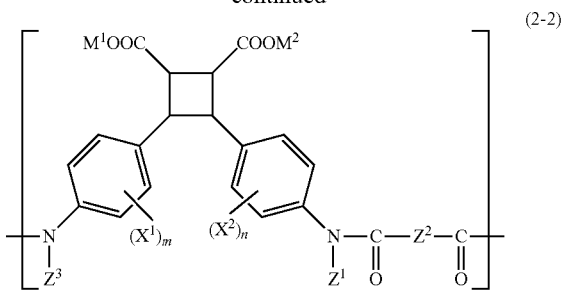

(2-2)

wherein, $M^1$, $M^2$, $X^1$, $X^2$, m, n, $Z^1$, $Z^2$ and $Z^3$ are the same as described above.

[3] The polymeric compound according to [1] or [2], wherein $Z^1$ and $Z^3$ represent a hydrogen atom; and $Z^2$ is an optionally substituted hydrocarbon group.

[4] The polymeric compound according to [1] or [2], wherein $Z^1$ and $Z^3$ represent an optionally substituted carbonyl group;

$Z^2$ is an optionally substituted hydrocarbon group; and $Z^1$ and $Z^3$ each independently form a ring structure together with $Z^2$.

[5] The polymeric compound according to [1] or [2], wherein the polymeric compound is represented by the following formula (3):

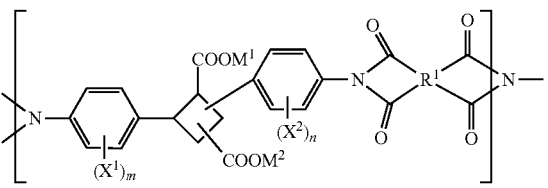

(3)

wherein $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an organic group;

m and n each independently represent the number of substituents; and $R^1$ represents an optionally substituted hydrocarbon group having 4 to 14 carbon atoms.

[6] The polymeric compound according to [1] or [2], wherein the polymeric compound is represented by the following formula (4):

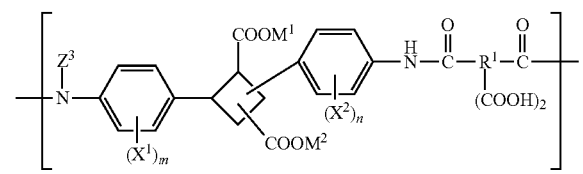

(4)

wherein $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an organic group;

m and n each independently represent the number of substituents; and $R^1$ represents an optionally substituted hydrocarbon group having 1 to 8 carbon atoms.

[7] A polymer gel composition comprising the polymeric compound according to any of [1] to [6] and a gelling agent.

[8] The polymer gel composition according to [7], wherein the gelling agent is a polyvalent metal salt or a diamine compound.

[9] The polymer gel composition according to [8], wherein the diamine compound is a compound represented by the following formula (5):

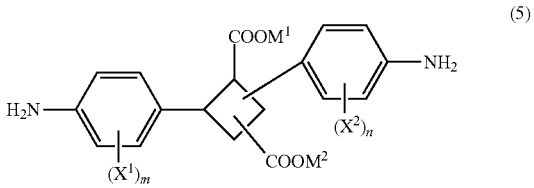

(5)

wherein, $M^1$, $M^2$, $X^1$, $X^2$, m and n are the same as described above.

[10] A film comprising the polymeric compound according to any of [1] to [6].

[11] A formed product comprising the polymeric compound according to any of [1] to [6].

Advantageous Effects of Invention

The polyamide or polyimide according to the present invention has high water solubility and can be subjected to casting from its aqueous solution, thereby achieving excellent processability. In addition, it can be formed into a gel, thereby further improving the formability. Moreover, although it is water soluble, the polyamide or polyimide according to the present invention has excellent heat resistance, and can be applied to fields such as water-soluble films, forming materials, optical lenses, paints, fibers, biomaterials and polyelectrolytes.

DESCRIPTION OF EMBODIMENTS

Figure 1:
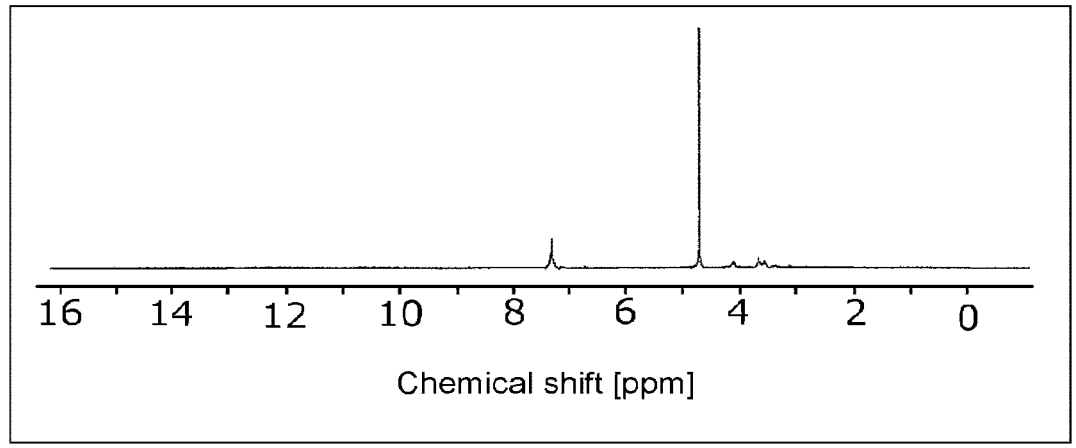
FIG. 1 is a graph showing the $^1$H-NMR spectrum of a hydrophilic polyimide obtained in Example 1.

The polymeric compound according to the present invention is characterized by having a repeating unit represented by the following formula (1):

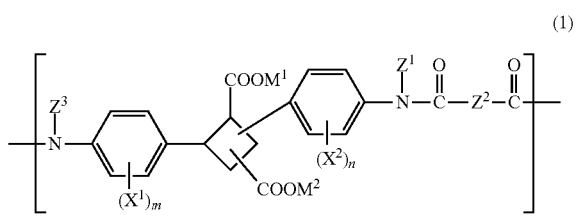

wherein $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an organic group;

m and n each independently represent the number of substituents;

$Z^1$ represents a hydrogen atom or an optionally substituted carbonyl group;

$Z^2$ represents an optionally substituted hydrocarbon group;

$Z^3$ represents a hydrogen atom or an optionally substituted carbonyl group; and when $Z^1$ or $Z^3$ is an optionally substituted carbonyl group, they optionally form a ring structure together with $Z^2$, each independently.

The polymeric compound according to the present invention has a repeating unit represented by formula (1) described above, but the number of types of the repeating unit included in the molecule is not particularly limited, and it may be 1 or 2 or more.

Specifically, the polymeric compound according to the present invention may be a polymeric compound having a structure represented by formula (1) described above as the only one repeating unit (homopolymer), or may be a polymeric compound having two or more repeating units (hereinafter, referred to as a copolymer).

The degree of polymerization in the polymeric compound according to the present invention is not particularly limited as long as effects of the present invention can be obtained. In the case of the copolymer described above, the ratio of repeating units included in the polymeric compound (the ratio of the degree of polymerization) is not particularly limited, either, as long as effects of the present invention can be obtained.

$M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time.

Here, an alkali metal atom is preferable for the monovalent metal atom, and examples thereof include Li, Na, K, Rb and Cs. Among them, Li, Na and K are more preferable. In addition, examples of the alkaline earth metal include Be, Mg, Ca, Sr and Ba. Among them, Be, Mg and Ca are more preferable. The ammonium ion is an ion derived from a compound having a primary amino group, a secondary amino group or a tertiary amino group, and examples thereof include an ammonium ion ($NH^{4+}$), an alkylammonium ion, an alkanolammonium ion and a pyridinium ion. An ammonium ion ($NH^{4+}$) is preferable from the viewpoint where a polymeric compound to be obtained has high solubility.

For $M^1$ and $M^2$, a hydrogen atom, an alkali metal atom, an alkaline earth metal atom or an ammonium ion ($NH^{4+}$) is preferable.

$X^1$ and $X^2$ represent an organic group. Here, examples of the organic group include an alkyl group and an alkoxy group. For $X^1$ and $X^2$, a $C_1$-$C_6$ alkyl group and a $C_1$-$C_6$ alkoxy group are preferable from the viewpoint where a polymeric compound to be obtained has high solubility.

m and n each independently represent the number of substituents, and are 0 or more and 4 or less. They are preferably 3 or less, more preferably 2 or less from the viewpoint where a polymeric compound to be obtained has high solubility, further preferably 0, that is, there is no substituent, from the viewpoint where a polymeric compound to be obtained has high solubility and the production therefor is convenient, and most preferably both 0.

$Z^1$ and $Z^3$ represent a hydrogen atom or an optionally substituted carbonyl group.

When $Z^1$ and $Z^3$ are a hydrogen atom, the polymeric compound according to the present invention is a polyamide. In addition, when $Z^1$ and $Z^3$ represent an optionally substituted carbonyl group, the polymeric compound according to the present invention is a polyimide. For $Z^1$ and $Z^3$, a hydrogen atom or a carbonyl group is preferable.

$Z^2$ represents an optionally substituted hydrocarbon group. Here, examples of the hydrocarbon group include an alkyl group, an alkenyl group, an alicyclic hydrocarbon group and an aromatic hydrocarbon group, and among them, an alicyclic hydrocarbon group or an aromatic hydrocarbon group is preferable. These hydrocarbon groups preferably have 1 to 14 carbon atoms, and in the case where they are cyclic, they preferably have 4 to 14 carbon atoms, and in the case where they are chainlike, they preferably have 1 to 8 carbon atoms from the viewpoint where a polymeric compound to be obtained has high solubility. For the alkyl group, a $C_1$-$C_8$ alkyl group is preferable, and for the alkenyl group, a $C_2$-$C_8$ alkenyl group is preferable.

For the alicyclic hydrocarbon group, an alicyclic hydrocarbon group having 4 to 14 carbon atoms is preferable, cyclobutane, cyclopentane, cyclohexane, cycloheptane and the like are more preferable, and cyclobutane, cyclopentane and cyclohexane are further preferable from the viewpoint where a polymeric compound to be obtained has high solubility. In addition, for the aromatic hydrocarbon group, an aromatic hydrocarbon group having 6 to 14 carbon atoms is preferable, benzene and naphthalene are more preferable from the viewpoint where a polymeric compound to be obtained has high solubility, and benzene is further preferable from the viewpoint where the production therefor is easier.

Moreover, examples of the group that can substitute these hydrocarbon groups include a $C_1$-$C_6$ alkyl group, a $C_1$-$C_6$ alkoxy group and a $C_2$-$C_6$ alkenyl group.

Furthermore, the substituent that Z optionally has is not particularly limited as long as effects of the present invention can be obtained, and includes various functional groups to the hydrocarbon groups described above or the case in which hydrocarbon groups described above are attached to each other through a carbon-heteroatom bond.

When $Z^1$ or $Z^3$ is an optionally substituted carbonyl group, they optionally form a ring structure together with $Z^2$, each independently. Such a ring structure is a structure of formula (3), which will be mentioned later.

Examples of the binding form of COOM$^2$ or a phenyl group to the cyclobutane ring in formula (1) include the form of formula (2-1) or (2-2):

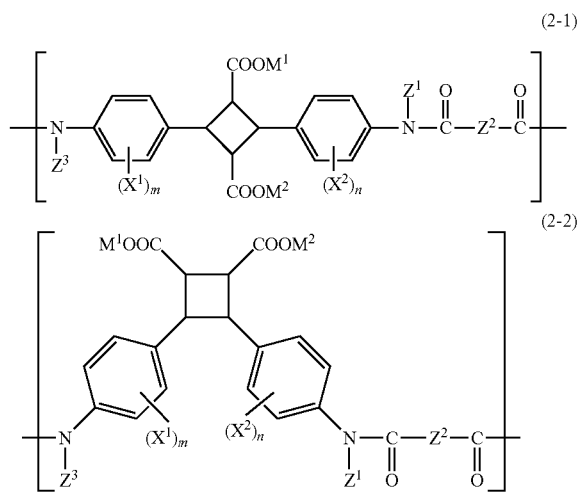

wherein, $M^1$, $M^2$, $X^1$, $X^2$, m, n, $Z^1$, $Z^2$ and $Z^3$ are the same as described above.

For formula (2-1) and formula (2-2), either polymeric compound to be obtained has effects of the present invention, but normally, the form represented by formula (2-1) is preferable in terms of higher mechanical strength. On the other hand, the form represented by formula (2-2) is preferable in terms of higher flexibility and formability of a polymeric compound to be obtained.

Among them, the form represented by formula (2-1) is more preferable because it presents higher mechanical strength upon bringing the polymeric compound into contact with an acid to convert it to be water insoluble, and therefore, processability and mechanical strength can be achieved at high level by utilizing the state change from the polymeric compound according to the present invention, which has water solubility.

In addition, when the polymeric compound according to the present invention is a polyimide, a preferable form thereof is a polyimide of the following formula (3):

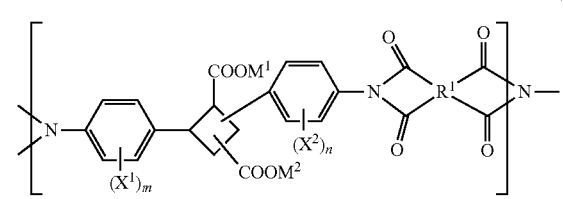

wherein, $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an organic group;

m and n each independently represent the number of substituents; and $R^1$ represents an optionally substituted hydrocarbon group having 4 to 14 carbon atoms.

In formula (3), $R^1$ is preferably an alicyclic hydrocarbon group having 4 to 14 carbon atoms or an aromatic hydrocarbon group having 6 to 14 carbon atoms, further preferably an alicyclic hydrocarbon group having 4 to 8 carbon atoms, and further preferably an alicyclic hydrocarbon group having 4 to 6 carbon atoms.

In addition, the substituent that $R^1$ optionally has is not particularly limited as long as effects of the present invention can be obtained, and includes various functional groups to the hydrocarbon groups described above or the case in which hydrocarbon groups described above are attached to each other through a carbon-heteroatom bond.

In addition, for a specifically preferable form in formula (3), the form described in formula (2-1) described above is preferable in terms of higher mechanical strength.

Specifically, it has a structure described in the following formula (3-1).

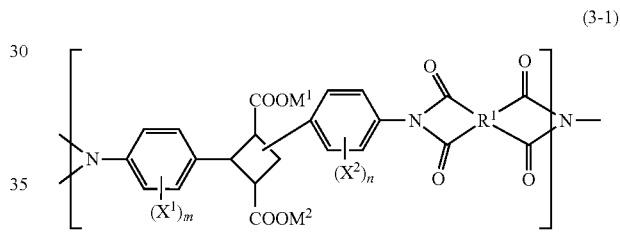

One preferable form of the polymeric compound according to the present invention is a polyamide acid of the following formula (4):

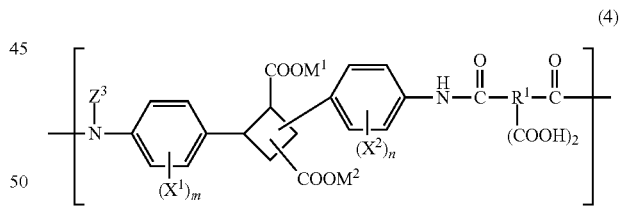

wherein, $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an organic group;

m and n each independently represent the number of substituents; and $R^1$ represents an optionally substituted hydrocarbon group having 1 to 8 carbon atoms.

In formula (4), $R^1$ is preferably an alicyclic hydrocarbon group having 4 to 14 carbon atoms or an aromatic hydrocarbon group having 6 to 14 carbon atoms, further preferably an alicyclic hydrocarbon group having 4 to 8 carbon atoms, and further preferably an alicyclic hydrocarbon group having 4 to 6 carbon atoms. As will be mentioned later, this is because such $R^1$ contributes to improvement in physical properties of the polyimide represented by formula (3) described above obtained from the polyamide acid represented by formula (4). The substituent is the same as formula (3) described above.

The polyamide acid represented by formula (4) can be regarded as a precursor for producing the polyimide represented by formula (3) described above. Specifically, the polyimide can be produced by heating the polyamide acid represented by formula (4).

In addition, for a specifically preferable form in formula (4), the form described in formula (2-1) described above is preferable in terms of higher mechanical strength.

Specifically, it has a structure of the following formula (4-1).

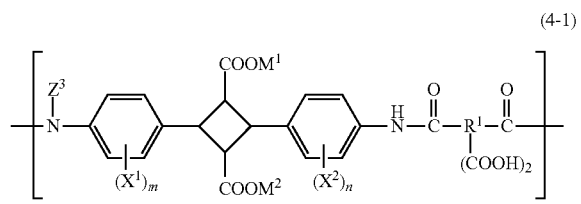

(4-1)

One preferable form of the polymeric compound according to the present invention is a polyamide of the following formula (5):

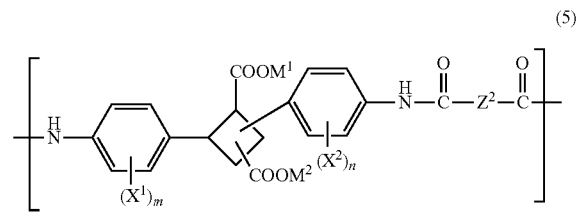

(5)

wherein, $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an organic group;

m and n each independently represent the number of substituents; and $Z^2$ represents an optionally substituted hydrocarbon group.

In formula (5), for $Z^2$, an alkylene group having 1 to 8 carbon atoms, an alicyclic hydrocarbon group having 4 to 8 carbon atoms, and an aromatic hydrocarbon group having 6 to 8 carbon atoms are preferable.

In addition, for a specifically preferable form in formula (5), the form described in formula (21) described above is preferable in terms of higher mechanical strength.

Specifically, it has a structure described in the following formula (5-1).

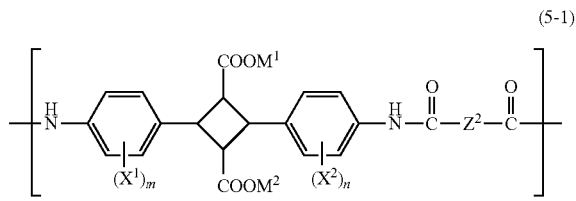

(5-1)

Whether the polymeric compound according to the present invention has a repeating unit represented by formula (1) can be readily confirmed by, for example, $^1$H-nuclear magnetic resonance (NMR) spectrum, $^{13}$C-nuclear magnetic resonance (NMR) spectrum, infrared (IR) absorption spectrum, mass spectrometry and the like.

The number average molecular weight of the polymeric compound according to the present invention is not limited as long as effects of the present invention can be obtained, but is normally 10,000 or more, preferably 50,000 or more, and normally 1,000,000 or less, preferably 500,000 or less from the viewpoint of improving hydrophilicity, transparency, heat resistance, flexibility and extensibility. The number average molecular weight of the hydrophilic polyimide according to the present invention is a value measured in accordance with the method described in Examples below.

Depending on the binding form of substituents on the cyclobutane ring, the polymeric compound according to the present invention has various optical isomers. According to the present invention, for example, the aspect of formula (2-2) described above include optical isomers represented by the following formula (6) and formula (7) and the racemate thereof, and either can be used. However, a polymeric compound obtained using monomers with high optical purity is preferable in terms of improvement in physical properties such as heat resistance and mechanical strength.

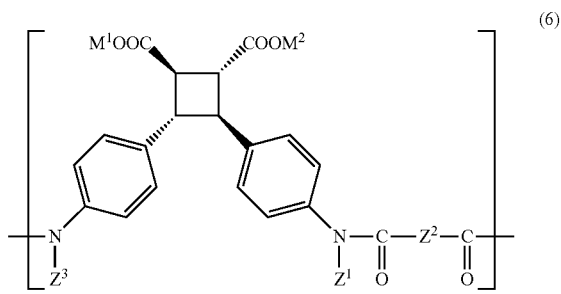

(6)

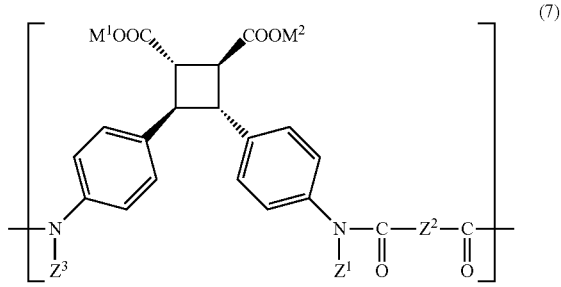

(7)

For the polymeric compound according to the present invention, optionally substituted 4-aminocinnamic acid or 4-nitrocinnamic acid is used as the starting raw material, and dimerized in accordance with the method described in Patent Literatures 1 and 2 described above to obtain optionally substituted 4,4'-diaminotruxillic acid, which is the central backbone of the repeating unit for the polymeric compound according to the present invention. By polycondensing this compound with a polycondensation component, a polyamide or polyimide is obtained, which is then treated with a monovalent metal salt, an alkaline earth metal salt or an amine compound to produce the polymeric compound according to the present invention. A method for polycondensation can be appropriately carried out in accordance with the known method in Patent Literatures 1 and 2 described above and the like. Hereinafter, as a typical example, production of a hydrophilic polyimide represented by formula (3-2) will be described in the case where 4,4'-diaminotruxillic acid is used as the raw material.

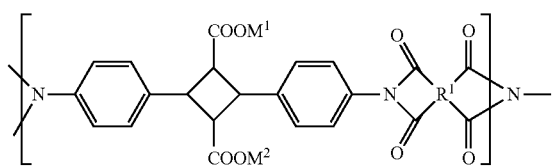

(3-2)

As the raw material for a hydrophilic polyimide represented by formula (3-2), 4,4'-diamino-α-truxillic acid represented by formula (8):

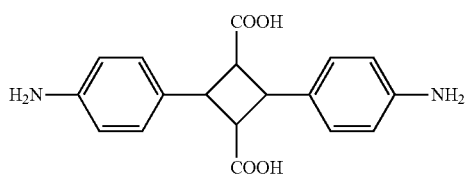

(8)

can be used. 4,4'-Diamino-α-truxillic acid has 4-aminocinnamic acid as its basic structure.

4,4'-Diamino-α-truxillic acid can be readily prepared utilizing photodimerization reaction of 4-aminocinnamate hydrochloride and neutralization reaction.

The photodimerization reaction of 4-aminocinnamate hydrochloride can be carried out by, for example, irradiating hydrochloride of 4-aminocinnamic acid with ultraviolet ray with a wavelength of approximately 250 to 400 nm.

When irradiating hydrochloride of 4-aminocinnamic acid with ultraviolet ray, hydrochloride of 4-aminocinnamic acid is preferably dispersed in an organic solvent in advance. Examples of the organic solvent include, for example, aliphatic hydrocarbon compounds having 6 to 12 carbon atoms such as hexane, but the present invention is not limited to such exemplification. In addition, the amount of the organic solvent is not particularly limited, and normally, it may be any amount as long as hydrochloride of 4-aminocinnamic acid can be dispersed sufficiently.

Examples of the light source for irradiating hydrochloride of 4-aminocinnamic acid with ultraviolet ray include, for example, a high pressure mercury vapor lamp, but the present invention is not limited to such exemplification. Duration for irradiating hydrochloride of 4-aminocinnamic acid with ultraviolet ray varies depending on the type of light source, the intensity of ultraviolet ray and the like, and therefore cannot be determined indiscriminately. Accordingly, it is preferable to irradiate hydrochloride of 4-aminocinnamic acid with ultraviolet ray until the target hydrochloride of 4,4'-diaminotruxillic acid is produced sufficiently.

As described above, by irradiating hydrochloride of 4-aminocinnamic acid with ultraviolet ray and subjecting hydrochloride of 4-aminocinnamic acid to photodimerization reaction, hydrochloride of 4,4'-diamino-α-truxillic acid can be obtained.

Note that, when hydrochloride of 4-aminocinnamic acid is dispersed in an organic solvent, the produced hydrochloride of 4,4'-diamino-α-truxillic acid can be collected by filtration. The collected hydrochloride of 4,4'-diamino-α-truxillic acid may be dried by drying under reduced pressure or the like, as necessary.

Subsequently, by adding an aqueous alkali solution such as an aqueous sodium hydroxide solution to the aqueous solution of hydrochloride of 4,4'-diamino-α-truxillic acid, that aqueous solution is adjusted to be basic. The crystallized crystals are dispersed in water, and to the dispersion thus obtained, hydrazine dihydrochloride is added. The solution thus obtained is neutralized with an acid such as acetic acid, and thereby, 4,4'-diamino-α-truxillic acid can be obtained.

A hydrophilic polyimide having a repeating unit represented by formula (1) can be obtained by allowing 4,4'-diamino-α-truxillic acid to react with a tetracarboxylic dianhydride represented by formula (9):

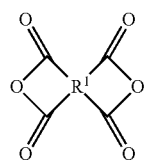

(9)

wherein $R^1$ is the same as described above.

More specifically, for example, 4,4'-diamino-α-truxillic acid represented by formula (8) and a tetracarboxylic dianhydride represented by formula (9) are dissolved in an aprotic polar organic solvent such as dimethylacetamide, and then, the solution thus obtained is stirred in an inert gas atmosphere such as nitrogen gas to allow 4,4'-diamino-α-truxillic acid to react with the tetracarboxylic dianhydride. The reaction solution thus obtained is added dropwise to a poor organic solvent such as ethanol to precipitate a polyamide acid, which is collected by filtration. The polyamide acid thus obtained is dissolved in a polar organic solvent such as dimethylacetamide, and the solution thus obtained is then heated to a temperature of approximately 100 to 300° C. Subsequently, when processing the solution with an aqueous solution of an alkali metal hydroxide, by regulating how much alkali metal salt is formed through adjustment of the amount of that aqueous solution of an alkali metal hydroxide, a hydrophilic polyimide (in formula (1), $M^1$ is an alkali metal and $M^2$ is a hydrogen atom or an alkali metal) can be obtained.

In addition, a hydrophilic polyimide (in formula (1), $M^1$ is an alkaline earth metal and $M^2$ is a hydrogen atom or an alkaline earth metal) can be obtained by processing the hydrophilic polyimide (in formula (1), $M^1$ is an alkali metal and $M^2$ is a hydrogen atom or an alkali metal) obtained as described above with an aqueous solution of an alkaline earth metal hydroxide.

Alternatively, as another production method, mention may be made of a method of producing a hydrophilic polyimide through a metal salt of 4,4'-diaminotruxillic acid.

Specifically, 4,4'-diaminotruxillic acid is dissolved using an aqueous solution of an alkali metal hydroxide, and the resultant solution is subjected to recrystallization using a poor solvent or the like to obtain a metal salt of 4,4'-diaminotruxillic acid. This metal salt is allowed to react with the tetracarboxylic dianhydride described in formula (9) described above, and a hydrophilic polyimide can be obtained.

Alternatively, the following 4,4'-diamino-β-truxillic acid (10) or 4,4'-diamino-δ-truxillic acid (11) may be used instead of 4,4'-diaminotruxillic acid described above.

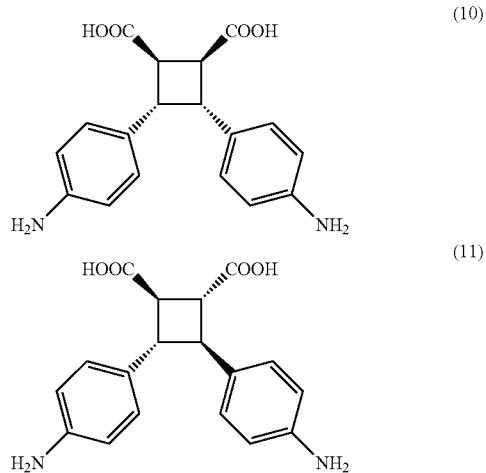

The polymeric compound according to the present invention has very excellent water solubility in the case where $M^1$ is a monovalent metal such as an alkali metal and $M^2$ is a hydrogen atom or a monovalent metal in formula (1). Note that having excellent water solubility means also having excellent hydrophilicity at the same time.

A hydrophilic polyimide (in formula (1), $M^1$ and $M^2$ are both an alkali metal) has a solubility of 50 g or more in 10 mL of water at 25° C. Accordingly, the hydrophilic polyimide (in formula (1), $M^1$ and $M^2$ are both an alkali metal) can be dissolved in water for use, and therefore, is expected to be used for applications such as water-soluble films and water-based paints.

A hydrophilic polyimide or polyamide in which $M^1$ and $M^2$ are both a monovalent metal has water solubility, but when it is brought into contact with an acid such as hydrochloric acid, it presents water insolubility. Accordingly, when water insolubility is to be imparted to the hydrophilic polyimide described above, that hydrophilic polyimide may be brought into contact with an aqueous acid solution. From the above, a fiber can be produced by extruding the hydrophilic polyimide described above from a spinning nozzle, and immersing and coagulating the filament extruded as described above in a coagulation liquid containing an acid or the like. The fiber obtained as such is excellent in water solubility, heat resistance, flexibility and extensibility, and therefore, is expected to be used for industrial materials and the like including clothes.

In addition, the polyimide to which water insolubility is imparted through contact with an acid can acquire water solubility again by, for example, being brought into contact with an alkali such as sodium hydroxide. Accordingly, when water insolubility is imparted to the hydrophilic polyimide described above by an acid, water solubility can be imparted thereto again by an alkali, and therefore, water solubility or water insolubility can be imparted readily. As such, that polyimide is expected to be used for applications such as biomaterials, films and paints.

When $M^1$ is a monovalent metal and $M^2$ is a polyvalent metal such as an alkaline earth metal or a diamine compound, and when $M^1$ and $M^2$ are both a polyvalent metal or a diamine compound in formula (1), the hydrophilic polyimide according to the present invention is self-crosslinkable in water due to the polyvalent metal or diamine compound that such a hydrophilic polyimide or polyamide has, thereby being formed into a gel. From the above, the hydrophilic polyimide or polyamide according to the present invention is in concept encompassing those having a crosslinked structure through a polyvalent metal or a diamine compound.

Accordingly, the present invention also provides a polymer gel composition comprising the polymeric compound of formula (1) and a gelling agent.

Here, examples of the gelling agent include a polyvalent metal salt and a diamine compound. Examples of the polyvalent metal salt include an alkaline earth metal salt and an aluminum salt. Examples of the diamine compound include water-soluble diamines such as an alkylene diamine, polyethylene glycol diamine, polylysine and spermine, and a compound represented by the following formula (12):

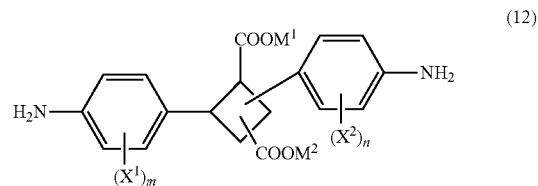

wherein, $M^1$, $M^2$, $X^1$, $X^2$, m and n are the same as described above.

For the compound described in formula (12), because of convenient production, it is preferable to use the starting raw material compound used when producing the polymeric compound according to the present invention, such as the compound of formula (8) for the compound described in formula (5-1) described above.

Since a hydrophilic polyimide or polyamide obtained by forming a crosslinked structure in the hydrophilic polyimide or polyamide according to the present invention with a gelling agent forms a gel when it is brought into contact with water, it is expected to be used for applications such as dispersion stabilizers for pharmaceutical preparations, paints, thickening agents, flowability inhibitors and polyelectrolytes.

As described hereinabove, while conventional polyimides have hydrophobicity, rigidity and poor extensibility, the hydrophilic polyimide or polyamide according to the present invention is excellent in hydrophilicity, transparency, heat resistance, flexibility and extensibility, and therefore, is expected to be used for various applications such as films, forming materials, optical materials including optical lenses and the like, water-based paints, fibers, biomaterials, dispersion stabilizers, thickening agents, flowability inhibitors and polyelectrolytes.

An aspect of the forming material described above is not particularly limited, and specific examples thereof include sponge-like materials. The forming method therefor is not particularly limited, but for example, the sponge-like material can be obtained by lyophilizing and pulverizing the gel described above.

Alternatively, as another aspect of the forming material, mention may be made of nanofiber-like materials. The forming method therefor is not particularly limited, but for example, the nanofiber-like material can be obtained by electrospinning the material described above.

EXAMPLES

Next, the present invention will be described in further detail based on Examples, but the present invention is not limited solely to such Examples.

Note that physical properties of compounds obtained in the following Examples and Comparative Examples were examined based on the following methods.

[$^1$H-NMR and $^{13}$C-NMR]
  Measuring apparatus: nuclear magnetic resonance spectrometer (manufactured by Bruker Corporation, product name: AVANCE III)

[Gel Permeation Chromatography (GPC)]
  Measuring apparatus: manufactured by SHOWA DENKO K.K., product name: Shodex-101
  Measurement conditions
    Concentration at the time of injection: 0.001% by mass
    Injection volume: 25 µL
    Flow rate: 0.5 mL/min
    Solvent: N,N-dimethylformamide
    Columns: manufactured by SHOWA DENKO K.K., product name: Shodex KD-803 and product name: Shodex KD-804
    Temperature of columns: 40° C.

[Fourier Transform Infrared Spectroscopy (FT-IR)]
  Measuring apparatus: manufactured by PerkinElmer, Inc., product name: Spectrum 100
  Measurement method: ATR method
  Measurement range: 380-4000 cm$^{-1}$
  Scanning counts: 4 times
  Resolution: 4.00 cm-1
  Top plate: diamond/KRS-5

[Light Transmittance of Film]
  Measuring apparatus: manufactured by JASCO Corporation, part number: V-670
  Light source: D2 lump
  Measurement range: 200-800 nm
  UV/Vis band width: 2.0 nm
  NIR band width: 8.0 nm
  Scanning speed: 100 nm/min

[Thermal Gravimetric Analysis]
  Measuring apparatus: simultaneous thermogravimetric analyzer [manufactured by Hitachi High-Technologies Corporation, product name: STA7200]
  The degree of weight reduction was measured in a nitrogen gas atmosphere while raising the temperature to 800° C. at a temperature raising rate of 10° C./min.

[Differential Scanning Calorimetry]
  Measuring apparatus: differential scanning calorimetry (DSC) apparatus: manufactured by Hitachi High-Technologies Corporation, product name: X-DSC7000T]
  Temperature raising rate: 10° C./min
  Cooling rate: 10° C./min

[Tensile Strength]
  A film was cut into a size of 25 mm long by 2.0 mm wide to produce a sample. A tensile testing machine (manufactured by Instron, product name: Series 3365 Load Frames-5 kND) was used, and the distance between chucks was set at 25 mm. The sample described above was fixed with chucks and was drawn at a crosshead speed of 0.50 mm/min to determine the stress-strain curve.

[X-Ray Diffraction]
  Method of producing X-ray sample
  A film was fixed to a SAXS/WAXS film sample holder with a magnet.
    Shape and size of sample: rectangular (20 mm long by 30 mm wide), thickness: 105 µm for hydrophilic polyimide film, 112 µm for imide polymer film
    Measurement mode: transmission method
    Apparatus: rotor type irradiation apparatus
  [Manufactured by Rigaku Corporation, Product Name: SmartLab]
    X-ray: CuKa ray (made monochromatic with a monochromator)
    X-ray output: 45 kV, 200 mA
    X-ray irradiation time: 300 s
    Distance between sample and detector: 27 mm
    Detector: manufactured by Rigaku Corporation, product name: HyPix-3000

Production Example 1

In 1.8 L of hexane at 25° C., 92 g of hydrochloride of 4-aminocinnamic acid prepared in advance was dispersed, and the dispersion thus obtained was irradiated with ultraviolet ray for 20 hours using a high pressure mercury vapor lamp, thereby obtaining hydrochloride of 4,4'-diamino-α-truxillic acid. The hydrochloride of 4,4'-diaminotruxillic acid thus obtained was separated by filtration and dried to collect 86.9 g of powder of hydrochloride of 4,4'-diaminotruxillic acid (yield: 94%).

The powder of hydrochloride of 4,4'-diamino-α-truxillic acid obtained as described above was dissolved in 3 L of water, and to the aqueous solution thus obtained, IN aqueous sodium hydroxide solution was added to adjust the pH of that aqueous solution to 10. As a result, white powder was crystallized. The white powder thus obtained was separated by filtration, washed with water, and then dried to obtain 60 g of a product. The product thus obtained was dispersed in water, and to the dispersion thus obtained, hydrazine dihydrochloride was added stoichiometrically. The dispersion was heated to 70° C., thereby dissolving the product, and subsequently, to the solution thus obtained, 18 g of activated charcoal was added, and the solution was stirred at 70° C. for 30 minutes. After cooling that solution to room temperature, the solution was filtered with a glass filter. To the filtrate thus obtained, acetic acid was added to adjust the pH of that filtrate to 3.5, thereby depositing white powder. By filtration, 48 g of 4,4'-diaminotruxillic acid was collected as white powder.

Example 1

After dissolving 10 g (28 mmol) of 4,4'-diamino-α-truxillic acid obtained in Production Example 1 and 5.9 g (28 mmol) of cyclobutanetetracarboxylic dianhydride in 30 mL of dehydrated dimethylacetamide, the solution thus obtained was stirred at room temperature for 36 hours in a nitrogen gas atmosphere, thereby allowing 4,4'-diamino-α-truxillic acid to react with cyclobutanetetracarboxylic dianhydride. The reaction solution thus obtained was added dropwise to methanol, thereby precipitating a polyamide acid as white solid. The yield amount of the polyamide acid thus obtained was 14.6 g, and the yield was 92%.

In 1.2 mL of dimethylacetamide, 300 mg of the polyamide acid obtained as described above was dissolved, and the solution thus obtained was cast onto a silicon wafer. By gradually raising the temperature in a vacuum oven to 100° C., 150° C., 200° C. and 250° C., a film of an imide polymer was formed.

Subsequently, 200 mg of the imide polymer obtained as described above was added to 4 mL of water, and 44 mg of potassium hydroxide was further added thereto. Upon this, that imide polymer was dissolved in the aqueous potassium hydroxide solution. When the solution thus obtained was added to ethanol, 230 mg of a hydrophilic polyimide was deposited. The hydrophilic polyimide obtained as described above was separated by filtration, dried and thus collected.

Figure 2:
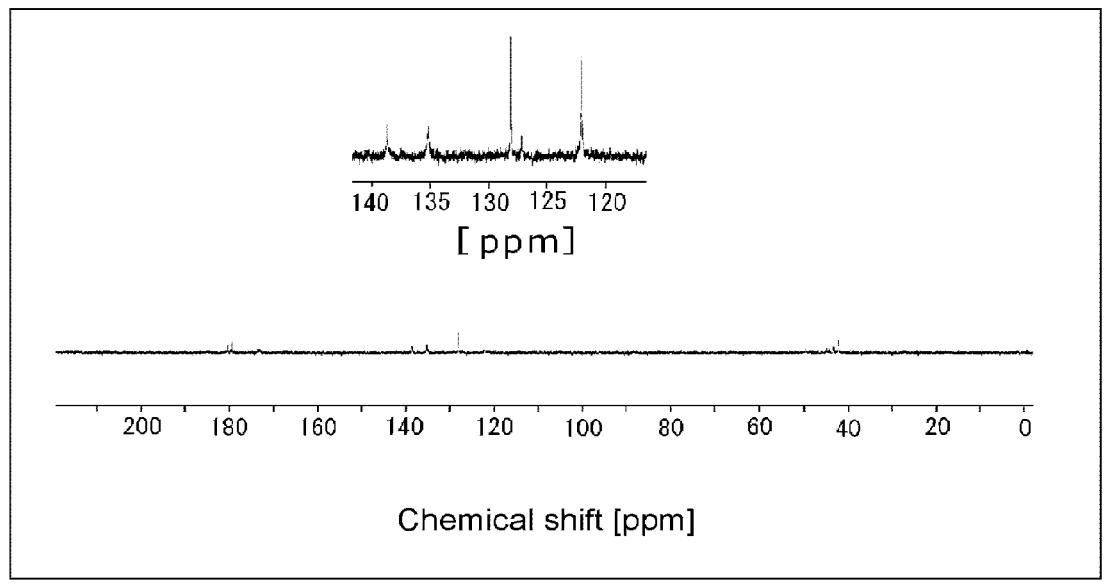
FIG. 2 is a graph showing the $^{13}$C-NMR spectrum of a hydrophilic polyimide obtained in Example 1.

When 10 mg of the hydrophilic polyimide obtained as described above was added to 2 mL of distilled water at 25° C., it was quickly dissolved therein. By using the aqueous solution of the hydrophilic polyimide obtained as described above, the $^1$H-NMR spectrum and the $^{13}$C-NMR spectrum of that hydrophilic polyimide were examined. The $^1$H-NMR spectrum and the $^{13}$C-NMR spectrum of the hydrophilic polyimide described above are shown in FIG. 1 and FIG. 2, respectively. From the results shown in FIG. 1 and FIG. 2, it was confirmed that the hydrophilic polyimide obtained as described above has a repeating unit (in formula (1), $M^1$ and $M^2$ are both potassium and $R^1$ is a tetravalent alicyclic hydrocarbon group having 4 carbon atoms (cyclobutyl group)).

In addition, upon examining the number average molecular weight of that hydrophilic polyimide by gel permeation chromatography (GPC) using the aqueous solution of the hydrophilic polyimide obtained as described above, it was confirmed that the number average molecular weight was $4.9 \times 10^5$.

Comparative Example 1

By carrying out the same operation as Example 1, a film of an imide polymer was produced. Upon examining the number average molecular weight of the imide polymer thus obtained by gel permeation chromatography (GPC), it was confirmed that the number average molecular weight was $4.9 \times 10^5$.

Figure 3:
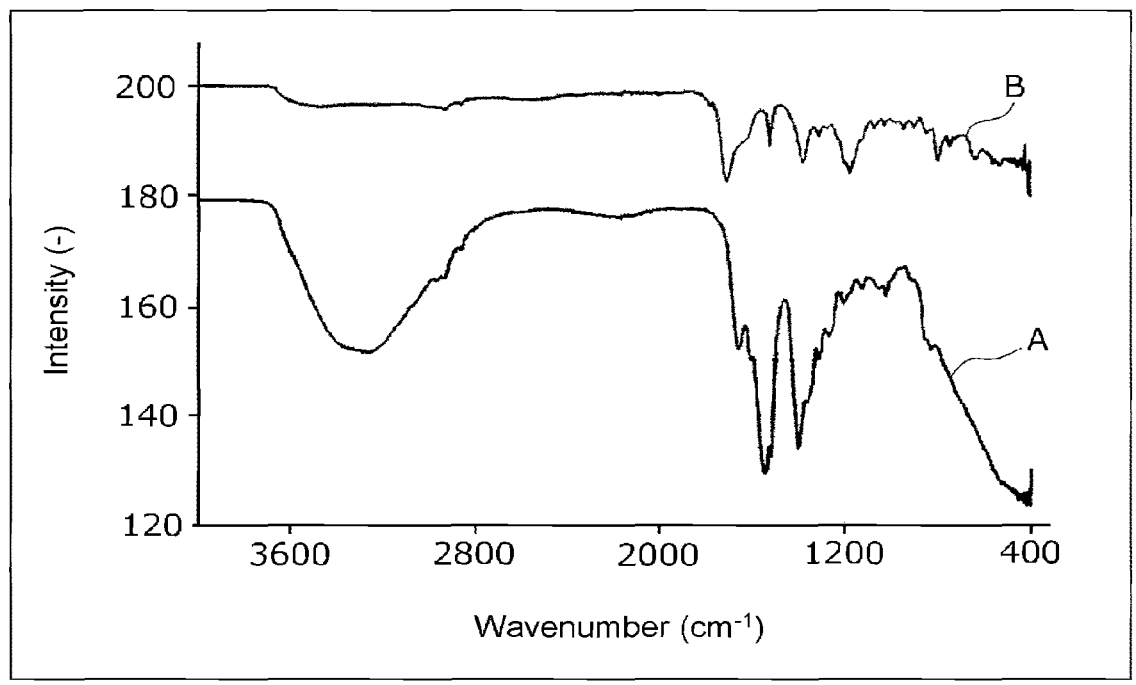
FIG. 3 is a graph showing results of Fourier transform infrared spectroscopy for a hydrophilic polyimide and an imide polymer obtained in Example 1.

Next, results of Fourier transform infrared spectroscopy for the hydrophilic polyimide obtained in Example 1 and the imide polymer obtained in Comparative Example 1 are shown in FIG. 3. In FIG. 3, A shows measurement results of the hydrophilic polyimide, and B shows measurement results of the imide polymer.

From the results shown in FIG. 3, it is understood that a peak present in the vicinity of 1,720 cm$^{-1}$ based on carboxyl groups that the imide polymer has is shifted to the vicinity of 1,785 cm$^{-1}$ and the vicinity of 1,525 cm$^{-1}$ because those carboxyl groups become potassium salts in the hydrophilic polyimide obtained as described above.

Next, as physical properties of the hydrophilic polyimide obtained as described above, hydrophilicity, water solubility, transparency, heat resistance, flexibility, extensibility and crystallinity were examined based on the following methods. Results for them are shown below.

[Hydrophilicity A]

The aqueous solution of the hydrophilic polyimide was cast onto a glass plate and dried, thereby forming a film of the hydrophilic polyimide, which was dried at room temperature. Onto the film thus formed, one drop of distilled water was dropped using a dropper, and that distilled water was visually observed.

On the film of the hydrophilic polyimide obtained in Example 1, distilled water spread onto the film instantaneously. From the above, it was confirmed that the hydrophilic polyimide described above is excellent in hydrophilicity.

[Hydrophilicity B]

A part of the film of the hydrophilic polyimide was added to distilled water at 25° C., and that film was visually observed.

For the film of the hydrophilic polyimide obtained in Example 1, that film was quickly dissolved in water within 1 second. From the above, it is understood that the hydrophilic polyimide obtained as described above is excellent in hydrophilicity (water solubility).

[Water Solubility]

Into a test tube, 100 mL of distilled water at 25° C. was placed, and that distilled water was stirred with a magnetic stirrer while adding a part of the film of the hydrophilic polyimide thereto. Addition of the film was stopped at the time point where stirring became difficult due to rise in viscosity, and the mass of the film that had been added until that time was measured.

For the hydrophilic polyimide obtained in Example 1, 159.45 mg of the film of that hydrophilic polyimide was dissolved in distilled water. From the above, it is understood that the hydrophilic polyimide obtained as described above is excellent in water solubility.

In addition, upon vertically turning over the test tube in which a solution formed by dissolving the film of the hydrophilic polyimide obtained as described above in distilled water was placed at room temperature, that solution had such high viscosity that almost no flowability was confirmed. From the above, it is understood that the hydrophilic polyimide described above reduces flowability and increases viscosity, and therefore, can be used as a thickening agent.

[Transparency]

Light transmittance of the film of the hydrophilic polyimide (thickness: 36 μm) was measured at a visible light region (400 to 800 nm).

The film of the hydrophilic polyimide obtained in Example 1 had a light transmittance at the wavelength region described above of 85% or more, and therefore, it is understood that the hydrophilic polyimide described above is excellent in transparency at the visible light region.

[Heat Resistance A]

Thermal gravimetric analysis was carried out for the film of the hydrophilic polyimide and the film of the imide polymer, and heat resistance was evaluated by examining the temperature at which decomposition starts for both polymers.

Figure 4:
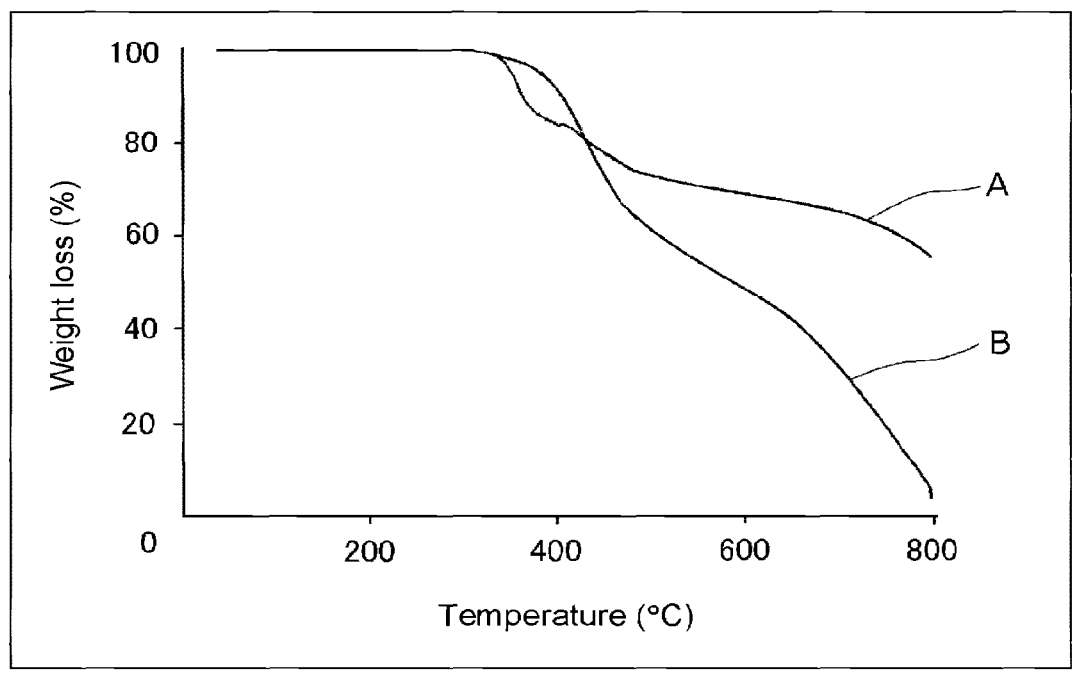
FIG. 4 is a graph showing results of thermal gravimetric analysis for a film of a hydrophilic polyimide and a film of an imide polymer obtained in Example 1.

Results of thermal gravimetric analysis for the film of the hydrophilic polyimide and the film of the imide polymer obtained in Example 1 are shown in FIG. 4. In FIG. 4, A is weight loss of the film of the hydrophilic polyimide, and B is weight loss of the film of the imide polymer.

From the results shown in FIG. 4, it was understood that the decomposition starting temperatures of the hydrophilic polyimide and imide polymer described above are both approximately 300° C., and therefore, there is almost no difference between the decomposition starting temperatures of the hydrophilic polyimide and imide polymer described above, but the hydrophilic polyimide exhibits smaller weight loss, and therefore, is excellent in heat resistance.

[Heat Resistance B]

Differential scanning calorimetry (DSC) was carried out for the film of the hydrophilic polyimide and the film of the imide polymer at a temperature range from room temperature to 250° C., and heat resistance was evaluated based on the results.

Figure 5:
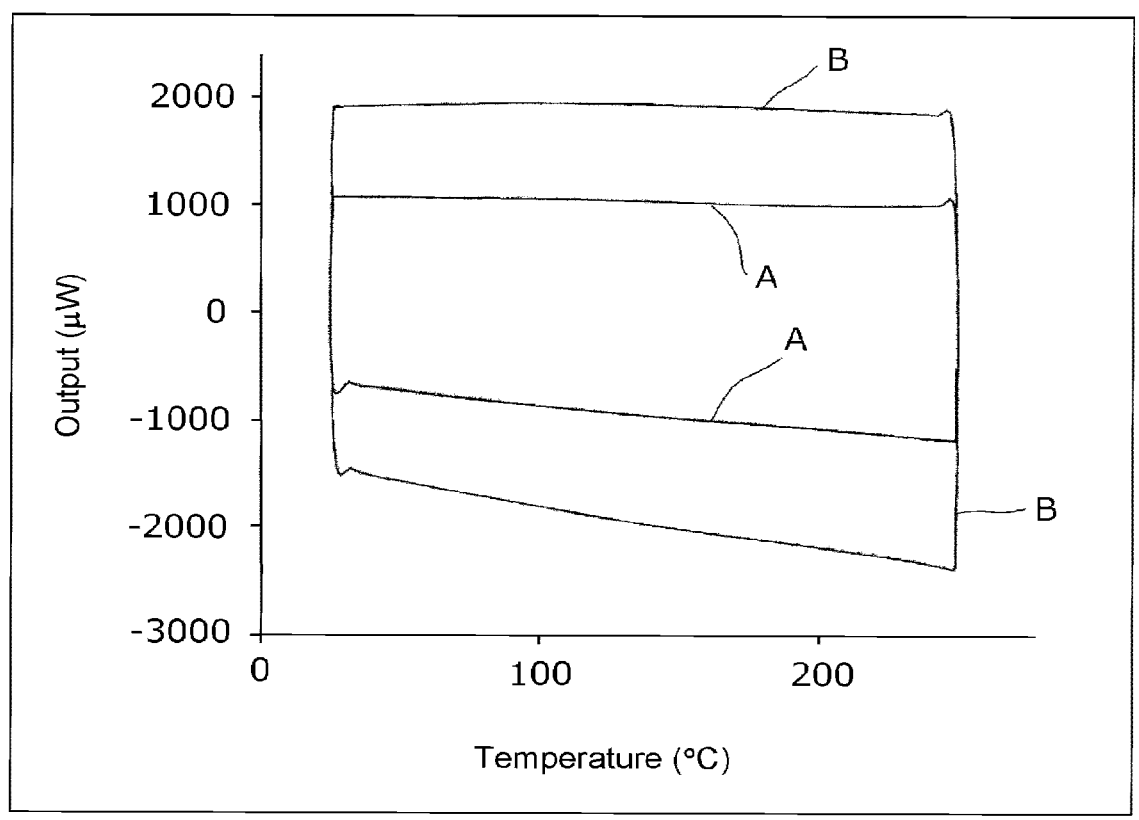
FIG. 5 is a graph showing results of differential scanning calorimetry for a film of a hydrophilic polyimide and a film of an imide polymer obtained in Example 1.

Results of differential scanning calorimetry (DSC) for the film of the hydrophilic polyimide and the film of the imide polymer obtained in Example 1 are shown in FIG. 5. In FIG. 5, A is the results of differential scanning calorimetry for the film of the hydrophilic polyimide, and B is the results of differential scanning calorimetry for the film of the imide polymer.

From the results shown in FIG. 5, for the hydrophilic polyimide described above, there was no inflection point confirmed at the temperature range up to a temperature of 250° C., as with the film of the imide polymer. From the above, it is understood that the hydrophilic polyimide described above has a softening point of 250° C. or more, and therefore, is excellent in heat resistance.

[Flexibility and Extensibility]

The tensile strength of the film of the hydrophilic polyimide and the film of the imide polymer was examined, and from the results, their flexibility and extensibility were evaluated.

Figure 6:
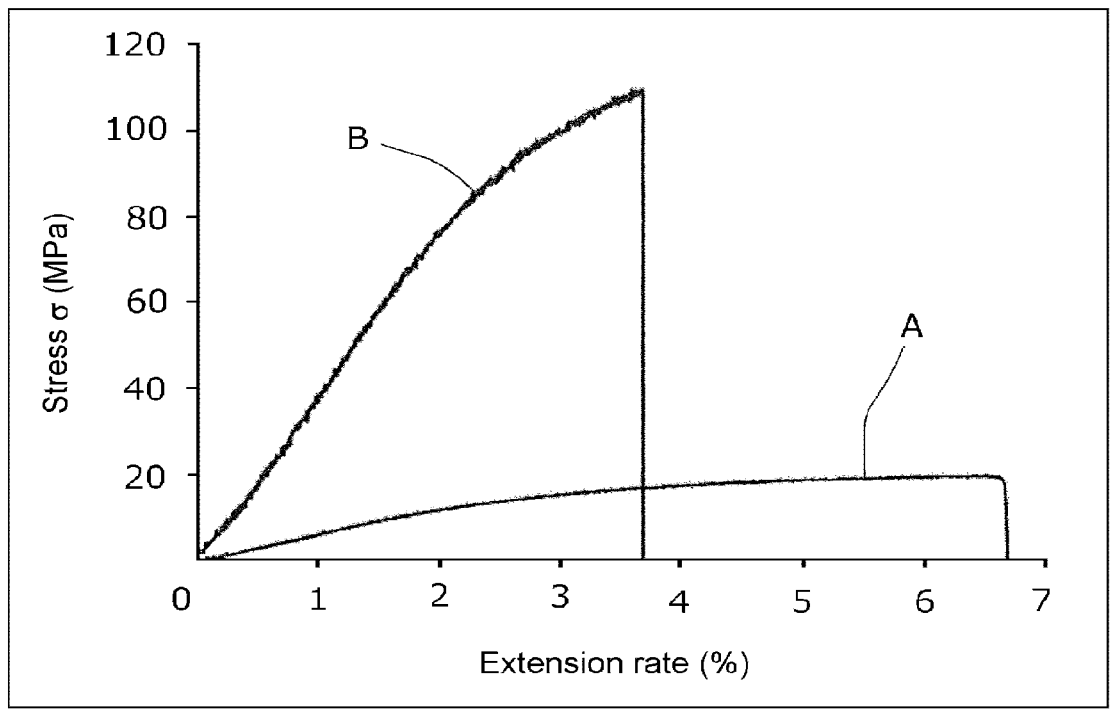
FIG. 6 is a graph showing measurement results of the tensile strength of a film of a hydrophilic polyimide and a film of an imide polymer obtained in Example 1.

Measurement results of the tensile strength for the film of the hydrophilic polyimide and the film of the imide polymer obtained in Example 1 are shown in FIG. 6. In FIG. 6, A is measurement results of the tensile strength for the film of the hydrophilic polyimide, and B is measurement results of the tensile strength for the film of the imide polymer.

From the results shown in FIG. 6, it is understood that, for the film of the hydrophilic polyimide obtained in Example 1, the stress is about one fifth of the film of the imide polymer, and the extension at break is about two times of the film of the imide polymer, and therefore, the hydrophilic polyimide is excellent in flexibility and extensibility.

From the above results, it is understood that the hydrophilic polyimide obtained in Example 1 is excellent in hydrophilicity, water solubility, transparency and heat resistance, and is further excellent in flexibility and extensibility.

[Crystallinity]

Figure 7:
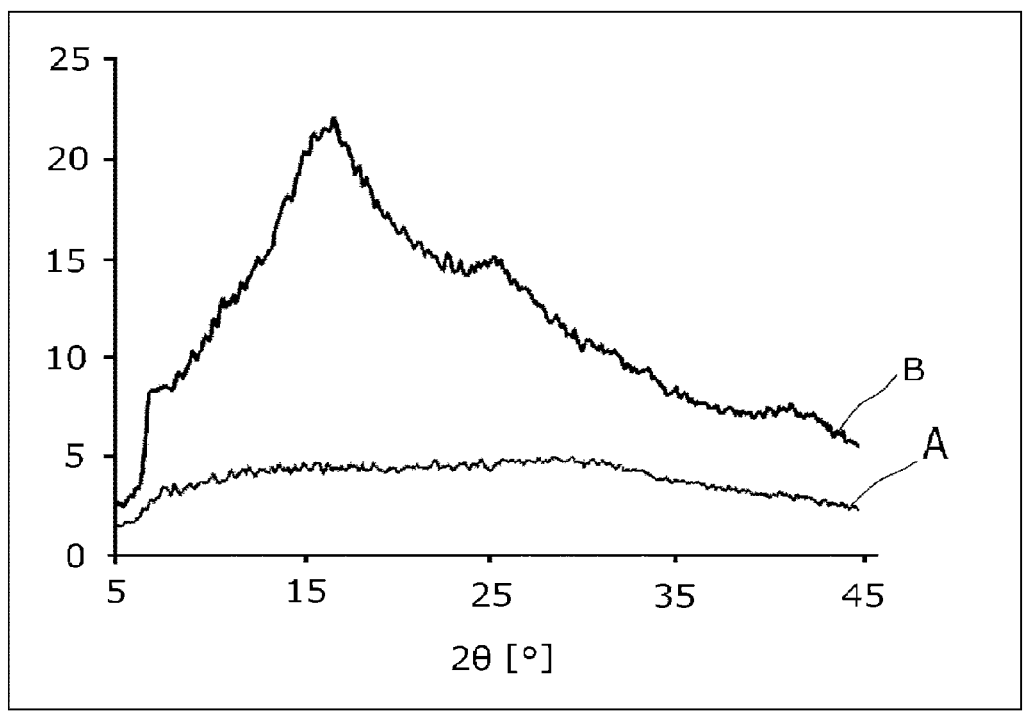
FIG. 7 is a graph showing the X-ray diffraction for a hydrophilic polyimide and an imide polymer obtained in Example 1.

The X-ray diffraction for the hydrophilic polyimide and the imide polymer was examined using the film of the hydrophilic polyimide and the film of the imide polymer. The results are shown in FIG. 7. In FIG. 7, A is the X-ray diffraction for the film of the hydrophilic polyimide, and B is the X-ray diffraction of the film of the imide polymer.

From the results shown in FIG. 7, it is understood that, for the imide polymer, side chain carboxyl groups form hydrogen bonds between polymer chains, thereby forming crystals, and some broad diffraction peaks are confirmed, whereas there is no diffraction peak confirmed for the hydrophilic polyimide obtained in Example 1. From the above, it is understood that the hydrophilic polyimide obtained in Example 1 is amorphous.

Example 2

Upon adding a part of the film of the hydrophilic polyimide obtained in Example 1 to 1 mL of a 14.6% aqueous calcium hydroxide solution at 25° C., a gel was formed. The hydrophilic polyimide constituting the film described above has potassium oxycarbonyl groups, but upon contact with calcium hydroxide, potassium of each of the potassium oxycarbonyl groups is substituted with calcium. Accordingly, in the hydrophilic polyimide represented by formula (1), M- and $M^2$ are both divalent calcium, and therefore, it is understood that such a hydrophilic polyimide has a crosslinked structure.

Example 3

Upon adding 0.01 mL of an aqueous solution of the hydrophilic polyimide obtained in Example 1 to 1 mL of a 14.6% aqueous calcium hydroxide solution at 25° C., a gel was formed. The hydrophilic polyimide described above has potassium oxycarbonyl groups, but upon contact with calcium hydroxide, potassium of each of the potassium oxycarbonyl groups is substituted with calcium. Accordingly, in the hydrophilic polyimide represented by formula (1), $M^1$ and $M^2$ are both divalent calcium, thereby forming a crosslinked structure. From the above, it is understood that the hydrophilic polyimide described above was formed into a gel.

Example 4

To 12.3 mL of a 1.0 mol·$L^{-1}$ aqueous potassium hydroxide solution, 4,4'-diamino-α-truxillic acid (2.0 g, 6.1 mmol) was added and dissolved therein. From this solution, water was distilled off under reduced pressure, and the crude product thus obtained was dissolved in ethanol (200 mL) for recrystallization, thereby quantitatively obtaining potassium salt of 4,4'-diamino-α-truxillic acid (hereinafter, referred to as 4ATA-K). The 4ATA-K (0.2 g, 0.5 mmol) described above was dissolved in N-methylpyrrolidone (0.8 mL) along with cyclobutanetetracarboxylic anhydride (0.11 g, 0.55 mmol) under nitrogen stream, and the resultant solution was stirred at 80° C. for 48 hours. The solution described above was precipitated again in methanol to obtain a water-soluble polyamide acid as white powder. The water-soluble polyamide acid thus obtained was dissolved in water and water was volatilized, thereby forming a film. This film was subjected to thermal imidization at 100° C. for 1 hour, subsequently at 150° C. for 1 hour, and furthermore at 200° C. for 3 hours, thereby producing a water-soluble polyimide film. The water-soluble polyimide film thus obtained was similar to that obtained in Example 1, and physical properties thereof were also similar.

Example 5

A film-like polyimide (100 mg) obtained by the method described in Example 1 was mixed with a 0.9 mmol·$L^{-1}$ aqueous potassium hydroxide solution and dissolved therein. After the dissolution, 4,4'-diamino-α-truxillic acid (62.5 mg, 0.2 mmol) and potassium hydroxide (20 mg, 0.04 mmol) were added thereto, and dissolved by further stirring. To the aqueous solution described above, an aqueous solution (0.3 mL) of 4-(4,6-dimethoxy-1,3,5-triazin-2-yl)-methylmorpholinium chloride (hereinafter, DMT-MM; 126 mg, 0.5 mmol) was added, and after quickly stirring the solution for 5 minutes, it was left at rest and 1.5 g of a transparent gel was obtained.

Even when this gel was left at rest for 24 hours in the air, the shape of the gel was not collapsed, and it was understood that this gel is a hydrogel with high stability.

Example 6

The gel obtained in Example 5 was frozen with liquid nitrogen, and subsequently dried using a lyophilizer (FDU- 1200 manufactured by EYERA). The freezing temperature was −47.3° C., and the pressure reduction degree was 11.5 Pa. The powder thus obtained was a polyimide sponge.

Example 7

In accordance with the method described in Example 4 of JP-A-2016-166315, 4-nitrocinnamic acid was dimerized, which was subsequently reduced, thereby producing 4,4'-diamino-β-truxinic acid.

4-Nitrocinnamic acid was dispersed in hexane, and the dispersion thus obtained was irradiated with ultraviolet ray for 24 hours using a high pressure mercury vapor lamp, thereby producing 4,4'-dinitro-β-truxinic acid from 4-nitrocinnamic acid. This product was reduced by the same method as that described in Example 4 of JP-A-2016-166315, thereby producing 4,4'-diamino-β-truxinic acid.

By the same procedure as Example 4, a film of a polyimide was obtained from 4,4'-diamino-β-truxinic acid.

Example 8

In accordance with the method described in Synthesis Example of paragraphs after [0086] of International Publication No. WO 2013/073519, 50 mg of a polyamide copolymer (random copolymer) was synthesized except that N,N'-diacetyl(4,4'-diaminotruxillic acid) (hereinafter, DNAc), 4,4'-diamino-α-truxillic acid and suberic acid were used at a molar ratio of 1:0.75:0.25. The structure is shown by the following structural formula (A).

Figure 8:
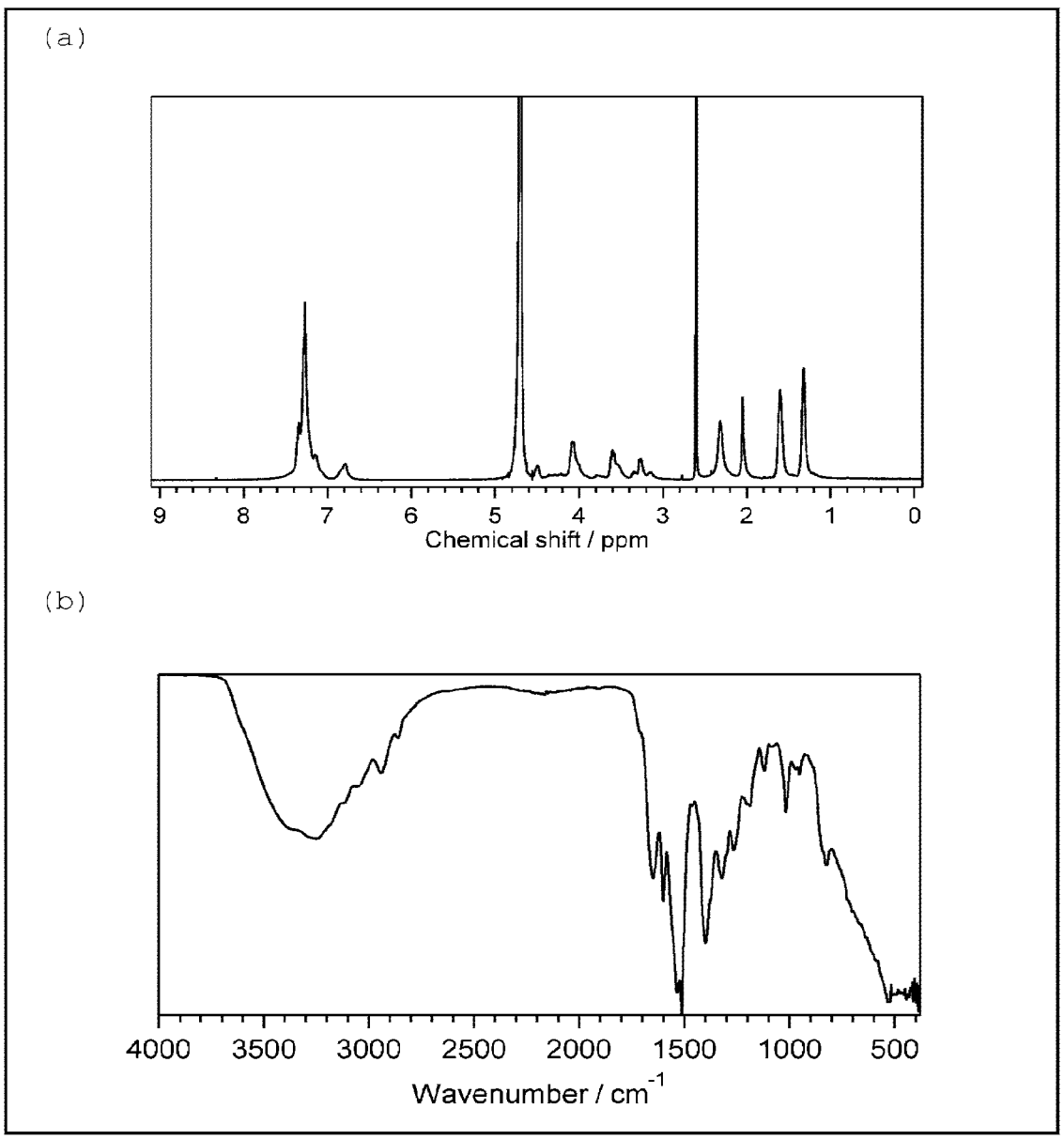
FIG. 8 is a graph showing (a) the $^1$H-NMR spectrum and (b) the FT-IR spectrum of a polyamide obtained in Example 8.

In 1.0 mL of dimethylsulfoxide, 50 mg of the polyamide copolymer described above was dissolved, 0.1 mL of water was added thereto, and the resultant solution was stirred until the polyamide was dissolved. Thereafter, 0.06 mL of a 3.0 mol·L$^{-1}$ aqueous potassium hydroxide solution was added to the solution, which was stirred for 12 hours. The solution described above was poured into a petri dish made of glass and heated at about 60° C. to remove the solvents, thereby obtaining a film-like water-soluble polyamide. The NMR chart and IR chart for the compound thus obtained are shown in FIG. 8.

INDUSTRIAL APPLICABILITY

The hydrophilic polyimide or polyamide according to the present invention is excellent in hydrophilicity, transparency and heat resistance, and is further excellent in flexibility and extensibility, and therefore, is expected to be used for various applications such as films, forming materials, optical materials including optical lenses and the like, water-based paints, fibers, biomaterials, dispersion stabilizers, thickening agents, flowability inhibitors and polyelectrolytes.

The invention claimed is:
1. A polymeric compound comprising a repeating unit represented by the following formula (1) or (3):

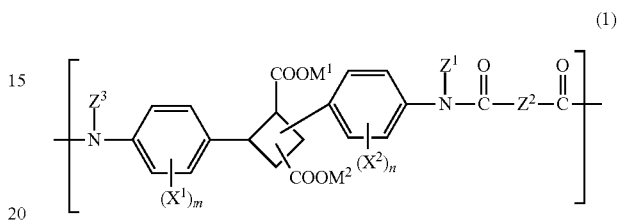

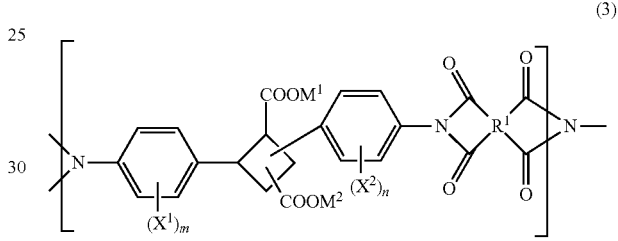

wherein
M$^1$ and M$^2$ each independently represent any one selected from the group consisting of a hydrogen atom, a monovalent metal atom, an alkaline earth metal atom and an ammonium ion, provided that M$^1$ and M$^2$ are not a hydrogen atom at the same time;
X$^1$ and X$^2$ represent an alkyl group or an alkoxy group;
m and n each independently represent 0 to 4;
Z$^1$ represents a hydrogen atom or a carbonyl group;
Z$^2$ represents an alkyl group, an alkenyl group, an alicyclic hydrocarbon group, an aromatic hydrocarbon group, or —R$^1$(COOH)$_2$—;
Z$^3$ represents a hydrogen atom or a carbonyl group; and

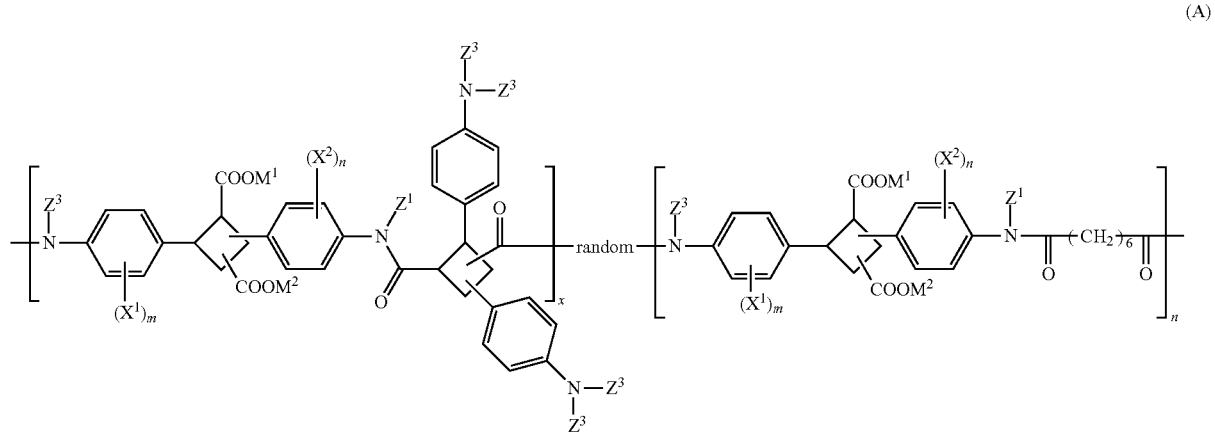

when $Z^1$ or $Z^3$ is an optionally substituted carbonyl group, they optionally form a ring structure together with $Z^2$, each independently, $R^1$ represents an alicyclic hydrocarbon group having 4 to 14 carbon atoms or an aromatic hydrocarbon group having 6 to 14 carbon atoms.

2. The polymeric compound according to claim 1, wherein the polymeric compound comprises a repeating unit represented by the formula (1), the repeating unit thereof is represented by the following formula (2-1) or (2-2):

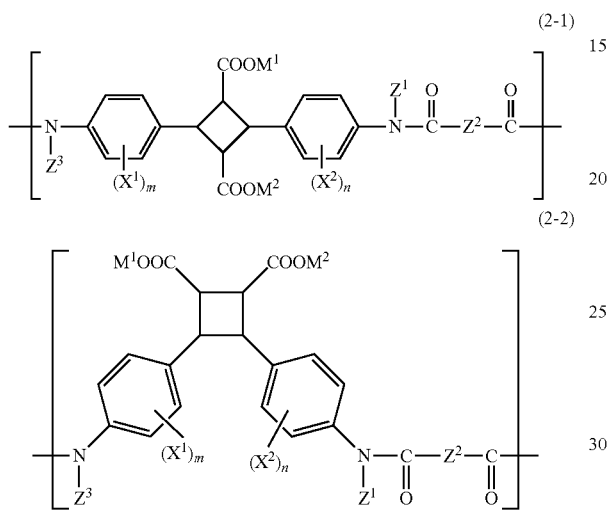

wherein, $M^1$, $M^2$, $X^1$, $X^2$, m, n, $Z^1$, $Z^2$ and $Z^3$ are as described in claim 1.

3. The polymeric compound according to claim 1, wherein $Z^1$ and $Z^3$ represent a hydrogen atom; and $Z^2$ is an alkyl group, an alkenyl group, an alicyclic hydrocarbon group, aromatic hydrocarbon group, or —$R^1(COOH)_2$—.

4. The polymeric compound according to claim 1, wherein the polymeric compound comprises a repeating unit represented by the formula (3), $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an alkyl group or an alkoxy group;

m and n each independently represent 0 or more and 4 or less; and $R^1$ represents an alicyclic hydrocarbon group having 4 to 14 carbon atoms or an aromatic hydrocarbon group having 6 to 14 carbon atoms.

5. The polymeric compound according to claim 4, wherein the repeating unit thereof is represented by the following formula (3-1):

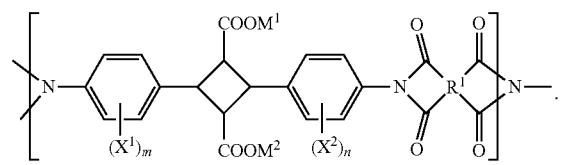

6. The polymeric compound according to claim 1, wherein the polymeric compound is represented by the following formula (4):

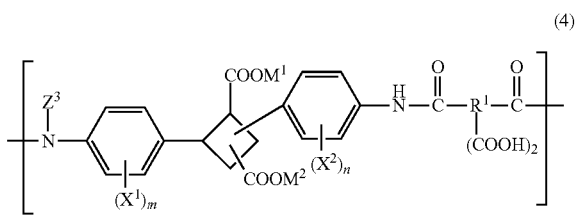

wherein $M^1$ and $M^2$ each independently represent any one selected from the group consisting of a hydrogen atom, a monovalent metal atom, an alkaline earth metal atom and an ammonium ion, provided that $M^1$ and $M^2$ are not a hydrogen atom at the same time;

$X^1$ and $X^2$ represent an alkyl group or an alkoxy group;

m and n each independently represent 0 to 4; and $R^1$ represents an alicyclic hydrocarbon group having 4 to 14 carbon atoms or an aromatic hydrocarbon group having 6 to 14 carbon atom.

7. A polymer gel composition comprising:
the polymeric compound according to claim 1; and
a gelling agent.

8. The polymer gel composition according to claim 7, wherein the gelling agent is a polyvalent metal salt or a diamine compound.

9. The polymer gel composition according to claim 8, wherein the diamine compound is a compound represented by the following formula (5):

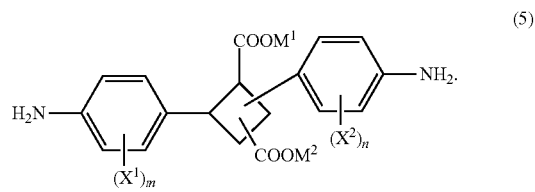

10. A film comprising the polymeric compound according to claim 1.

11. A formed product comprising the polymeric compound according to claim 1.

12. The polymeric compound according to claim 1, wherein the number average molecular weight of the polymeric compound is 10,000 or more and 1,000,000 or less.

13. A gel which is obtained by forming a crosslinked structure through $M^1$ and $M^2$ of the polymeric compound according to claim 1.

* * * * *